(12) United States Patent
Cuthbert et al.

(10) Patent No.: US 9,542,486 B2
(45) Date of Patent: Jan. 10, 2017

(54) TECHNIQUES FOR REAL-TIME TRANSLATION OF A MEDIA FEED FROM A SPEAKER COMPUTING DEVICE AND DISTRIBUTION TO MULTIPLE LISTENER COMPUTING DEVICES IN MULTIPLE DIFFERENT LANGUAGES

(71) Applicant: Google Inc., Mountain View, CA (US)

(72) Inventors: Alexander Jay Cuthbert, Oakland, CA (US); Joshua James Estelle, San Francisco, CA (US)

(73) Assignee: Google Inc., Mountain View, CA (US)

( * ) Notice: Subject to any disclaimer, the term of this patent is extended or adjusted under 35 U.S.C. 154(b) by 64 days.

(21) Appl. No.: 14/289,928

(22) Filed: May 29, 2014

(65) Prior Publication Data
US 2015/0347395 A1 Dec. 3, 2015

(51) Int. Cl.
*G06F 17/28* (2006.01)
*G06F 17/30* (2006.01)

(52) U.S. Cl.
CPC ....... *G06F 17/30743* (2013.01); *G06F 17/289* (2013.01); *G06F 17/2827* (2013.01); *G06F 17/2872* (2013.01)

(58) Field of Classification Search
CPC ............... G10L 17/289; G10L 17/2872; G10L 17/2827; G10L 17/2836; G10L 17/271; G10L 17/2818; G10L 17/2735; G10L 9/4448; G10L 17/275; G10L 17/2863
(Continued)

(56) References Cited

U.S. PATENT DOCUMENTS 6,292,769 B1    9/2001   Flanagan et al.
6,711,618 B1 *  3/2004   Danner .................. H04L 29/06
                                                     704/E15.044
(Continued)

FOREIGN PATENT DOCUMENTS

EP    2373016      10/2011
WO    2010096908   9/2010
WO    2013071004   5/2013

OTHER PUBLICATIONS

International Search Report and Written Opinion for International Application No. PCT/US2015/032517 mailed Aug. 26, 2015, 15 pages.

*Primary Examiner* — Vu B Hang
(74) *Attorney, Agent, or Firm* — Remarck Law Group PLC (57) ABSTRACT

A computer-implemented technique can include receiving a media feed from a speaker computing device representing speech of a speaker user captured by the speaker computing device. The technique can include receiving a plurality of translation requests, each translation request being received from a listener computing device associated with a listener user and corresponding to a request to obtain a translated version of the media feed into a preferred language of the listener user. The technique can include determining the preferred language for each listener user. The technique can include obtaining a machine translated media feed for each of the translation requests, the machine translated media feed corresponding to a translation of the media feed from the source language to the preferred language of the listener user associated with the translation request. The technique can also include outputting the machine translated media feeds to the listener computing devices.

20 Claims, 7 Drawing Sheets

(58) Field of Classification Search
USPC .................................................. 704/2, 3, 8, 7
See application file for complete search history.

(56) References Cited

U.S. PATENT DOCUMENTS

| | | |
|---|---|---|
| 7,747,434 B2 | 6/2010 | Flanagan et al. |
| 8,364,466 B2 | 1/2013 | Nash et al. |
| 2003/0115059 A1 | 6/2003 | Jayaratne |
| 2008/0221862 A1* | 9/2008 | Guo ...................... G06F 17/289 |
| | | 704/2 |
| 2009/0037171 A1 | 2/2009 | Mcfarland et al. |
| 2011/0066422 A1* | 3/2011 | Hybschmann ........ H04M 3/567 |
| | | 704/3 |
| 2013/0185052 A1* | 7/2013 | Boyd ...................... G06F 17/28 |
| | | 704/3 |
| 2013/0226557 A1 | 8/2013 | Uszkoreit et al. |

* cited by examiner

TECHNIQUES FOR REAL-TIME TRANSLATION OF A MEDIA FEED FROM A SPEAKER COMPUTING DEVICE AND DISTRIBUTION TO MULTIPLE LISTENER COMPUTING DEVICES IN MULTIPLE DIFFERENT LANGUAGES

FIELD

The present disclosure generally relates to machine translation and, more particularly, to real-time translation of a media feed from a speaker computing device and distribution to multiple listener computing devices in multiple different languages.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Situations arise where a speaker is speaking in a language that is not spoken or understood by a listener. One solution is for a human translator to translate the words of the speaker with a slight delay into a language spoken or understood by the listener. This is also known as manual translation. When there are multiple listeners and different languages, multiple human translators would be required, which could be costly. Therefore, there remains a need for an improvement in the area of language translation and distribution.

SUMMARY

A computer-implemented technique is presented. The technique can include receiving, at a server having one or more processors, a media feed from a speaker computing device, the media feed corresponding to a representation of speech of a speaker user in a source language that is captured by the speaker computing device. The technique can include receiving, at the server, a plurality of translation requests, each translation request being received from a listener computing device associated with a listener user and corresponding to a request to obtain a translated version of the media feed into a target language of the listener user. The technique can include determining, at the server, a preferred language for each listener user. The technique can include obtaining, at the server, a machine translated media feed for each of the translation requests, the machine translated media feed corresponding to a translation of the media feed from the source language to the preferred language of the listener user associated with the translation request. The technique can also include outputting, from the server, the machine translated media feeds to the listener computing devices.

In some embodiments, the technique further includes receiving, at the server from the speaker computing device, an initialization request for the server to provide the machine translated media feeds in response to the translation requests.

In other embodiments, the technique further includes outputting, from the server, a unique identifier in response to receiving the initialization request, wherein each of the translation requests are generated in response to inputting the unique identifier at the respective listener computing devices.

In some embodiments, the unique identifier is a unique uniform resource locator (URL) or a unique two-dimensional barcode.

In other embodiments, receiving each translation request at the server includes receiving, at the server, each translation request from the speaker computing device in response to the speaker computing device receiving each translation request from its respective listener computing device via short-range wireless communication.

In some embodiments, outputting each machine translated media feed to its respective listener computing device includes transmitting, from the server, each machine translated media feed to the speaker computing device, wherein receiving each translated media feed causes the speaker computing device to transmit each machine translated media feed to its respective listener computing device via short-range wireless communication.

In other embodiments, the media feed includes at least one of (i) an audio stream in the source language and (ii) text in the source language transcribed from the audio stream.

In some embodiments, the machine translated media feed includes at least one of (i) an audio stream in the target language and (ii) text in the target language transcribed from the audio stream In other embodiments, the speaker computing device is a mobile computing device. In some embodiments, the mobile computing device is wearable, computer-implemented eyewear.

A system is also presented. The system can include a server having one or more processors configured to perform operations. The operations can include receiving a media feed from a speaker computing device, the media feed corresponding to a representation of speech of a speaker user in a source language that is captured by the speaker computing device. The operations can include receiving a plurality of translation requests, each translation request being received from a listener computing device associated with a listener user and corresponding to a request to obtain a translated version of the media feed into a target language of the listener user. The operations can include determining a preferred language for each listener user. The operations can include obtaining a machine translated media feed for each of the translation requests, the machine translated media feed corresponding to a translation of the media feed from the source language to the preferred language of the listener user associated with the translation request. The operations can also include outputting the machine translated media feeds to the listener computing devices.

In some embodiments, the operations further include receiving, from the speaker computing device, an initialization request for the server to provide the machine translated media feeds in response to the translation requests.

In other embodiments, the operations further include outputting a unique identifier in response to receiving the initialization request, wherein each of the translation requests are generated in response to inputting the unique identifier at the respective listener computing devices.

In some embodiments, the unique identifier is a URL or a unique two-dimensional barcode.

In other embodiments, receiving each translation request at the server includes receiving each translation request from the speaker computing device in response to the speaker computing device receiving each translation request from its respective listener computing device via short-range wireless communication.

In some embodiments, outputting each machine translated media feed to its respective listener computing device includes transmitting each machine translated media feed to the speaker computing device, wherein receiving each translated media feed causes the speaker computing device to transmit each machine translated media feed to its respective listener computing device via short-range wireless communication.

In other embodiments, the media feed includes at least one of (i) an audio stream in the source language and (ii) text in the source language transcribed from the audio stream.

In some embodiments, the machine translated media feed includes at least one of (i) an audio stream in the target language and (ii) text in the target language transcribed from the audio stream In other embodiments, the speaker computing device is a mobile computing device. In some embodiments, the mobile computing device is wearable, computer-implemented eyewear.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As mentioned above, there remains a need for an improvement in the area of language translation and distribution. Multiple human translators for multiple different languages can be costly and human translators produce a slight delay in translation. Conventional machine translation systems, on the other hand, can be complex and time consuming to coordinate for multiple users in multiple different languages. Moreover, conventional machine translation systems typically transcribe and then translate audio after the fact (e.g., for annotating, dubbing, and/or captioning of videos), but they are not able to send both translated audio and text to a requesting device in real-time. More specifically, a text translation is often returned to the requesting device first, with separate action required to request the audio translation.

Accordingly, techniques are presented for real-time translation of a media feed from a speaker computing device and distribution to multiple listener computing devices in multiple different languages. More specifically, the techniques allow listener users to quickly join ad-hoc groups via their computing devices and receive a translated media feed in real-time. In response to an initialization request from a speaker user, the speaker computing device can capture an audio stream from the speaker user. The speaker computing device can obtain a media feed, which can include the audio stream, text transcribed from the audio stream, or a combination thereof. The speaker computing device and/or the server can output a unique identifier in response to receiving the initialization request, which can be used by listener computing devices to access private channel(s) containing translated media feeds.

Obtaining the unique identifier at a specific listener computing device can cause the listener computing device to generate and transmit a translation request to the server. In response to receiving the translation requests and the media feed, the server can determine preferred language(s) of the corresponding listener users. For example, the preferred language(s) may be included in the translation requests. The server can then obtain translations of the media feed from its source language to target language(s) indicated by the preferred language(s). This can be done at the server itself and/or using one or more other servers. The server can then output the translated media feeds to the listener computing devices via one or more private channels. For example, there may be one private channel per target language.

One example implementation of these techniques involves a speaker user that is presenting to a group of listener users. For example, the speaker user could be a presenter at a conference or a leader of a tourist group. The speaker user can have a mobile computing device, such as computer-implemented eyewear. Computer-implemented eyewear or other suitable wearable computer-implemented technology (e.g., a smart watch) can allow the speaker user to present/interact in a more effective manner with the listener users. Computer-implemented eyewear can also allow the speaker user to continue speaking/presenting while also monitoring a status of the techniques of the present disclosure (transcription of his/her audio stream, number of listeners receiving translated media feeds and/or their languages, etc.).

In one example implementation, the listener users may be in a foreign country and thus their computing devices (e.g., their mobile phones) may not have access to the Internet, such as via a cellular data network. One such example is the listener users being part of a tourist group lead by the speaker user. In these situations, the speaker's computing device can be configured to communicate with the listener computing devices via short-range wireless communication (Bluetooth, WiFi Direct, near field communication (NFC), etc.) and act as a proxy between the listener computing devices and the server. Thus, the listener computing devices may be able to provide the translation request and receive the translated media feeds without having Internet access.

The techniques of the present disclosure are also applicable to situations where there is more than one speaker user and one or more speaker computing devices. In some cases, each speaker user may also be speaking in a different language. In these situations, separate audio streams can be recognized, transcribed, and translated. The specific speaker user may also be identified in the translated media feed, such as by color coding transcribed text in the translated media feed. In this manner, the listener user is able to ascertain which speaker user is associated with a specific portion of the translated media feed.

While the techniques of the present disclosure are described as being implemented at a remote hardware computer server, it will be appreciated that at least a portion of these techniques may be implemented locally. For example only, the machine translation may be performed by the speaker computing device and the speaker computing device may then distribute the machine translated media feeds, such as via the short-range wireless communication mediums discussed herein.

Figure 1:
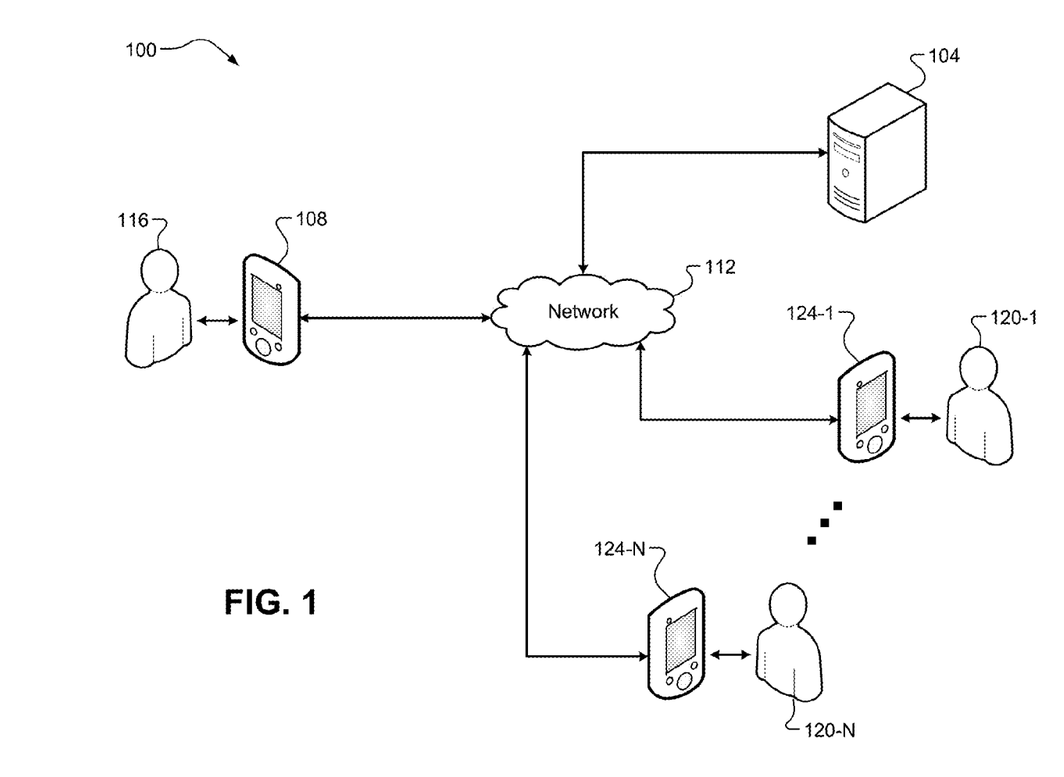
FIG. 1 is a functional block diagram of an example computing network according to some implementations of the present disclosure.

Referring now to FIG. 1, a computing network 100 is illustrated. The computing network 100 includes an example server 104 configured to execute at least a portion of the translation and distribution techniques of the present disclosure. It should be appreciated that the term "server" as used herein can refer to both a single hardware computer server and a plurality of similar servers operating in a parallel or distributed architecture. For example only, the computing network 100 may include a server 104 for each language that an audio feed is to be translated. An example mobile computing device 108 is configured to communicate with the server 104 via a network 112. Examples of the mobile computing device 108 include a laptop computer, a tablet computer, a mobile phone, and wearable technology, such as a smartwatch, eyewear, or other wearable objects that incorporate a computing device. It should be appreciated, however, that the techniques of the present disclosure could be implemented at any computing device having a microphone, e.g., a desktop computer.

The network 112 can include a local area network (LAN), a wide area network (WAN), e.g., the Internet, or a combination thereof. The network 112 can also include short-range wireless communication channels (Bluetooth, WiFi Direct, NFC, etc.). The mobile computing device 108 can be associated with a speaker user 116 that is speaking to a group of listener users 120-1 . . . 120-N (N≥1, collectively "listener users 120") associated with example computing devices 124-1 . . . 124-N (collectively "computing devices 124"), respectively. The mobile computing device 108 and the computing devices 124 can be referred to as a "speaker computing device 108" and "listener computing devices 124," respectively. When the speaker user 116 is speaking in a language that is not spoken or understood by a specific listener user 120, a real-time translation can be provided to the specific listener computing device 124 associated with the specific listener user 120 according to the techniques of the present disclosure.

Figure 2A:
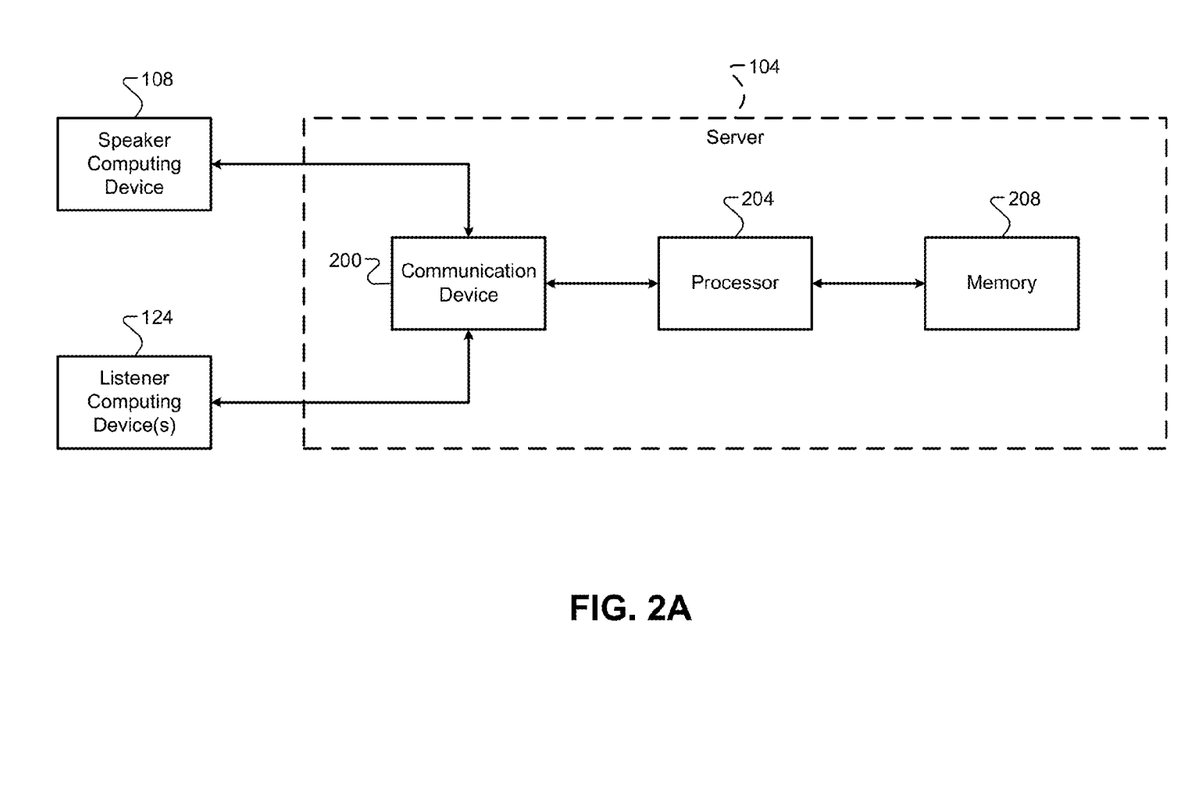
FIG. 2A is a functional block diagram of an example server according to some implementations of the present disclosure.

Referring now to FIG. 2A, a functional block diagram of the example server 104 is illustrated. The server 104 can include a communication device 200, a processor 204, and a memory 208. The communication device 200 can include any suitable components (e.g., a transceiver) configured for communication with other devices (e.g., speaker computing device 108) via the network 112. The processor 204 can control operation of the server 104 and can implement at least a portion of the techniques of the present disclosure, which are described in greater detail below. It will be appreciated that the term "processor" as used herein can refer to both a single processor and a plurality of processors operating in a parallel or distributed architecture. The memory 208 can be any suitable storage medium (flash, hard disk, etc.) configured to store information at the server 104.

In one example implementation, the server 104 can initially detect whether an initialization request has been received from the speaker computing device 108. This initialization request can indicate that the speaker user 116 wants others (e.g., the listeners 120) to be able to obtain translations of a media feed from the speaker computing device 108. The term "media feed" as used herein can refer to any suitable media feed corresponding to a representation of speech of the speaker user 116 in a source language that is captured by the speaker computing device 108. Examples of the media feed include an audio stream, text transcribed from the audio stream, and a combination thereof. In response to receiving the initialization request, the server 104 can output a unique identifier. This unique identifier can be used to access channels corresponding to translations of the media feed. For example, there may be a channel for each language to which the media feed is translated.

Outputting the unique identifier can include posting the unique identifier to a publicly-accessible website or transmitting/broadcasting the unique identifier to nearby/proximate computing devices, such as the listener computing devices 124. Other suitable techniques for distributing the unique identifier to potentially interested participants may also be used. Examples of the unique identifier include a unique uniform resource locator (URL) and a unique two-dimensional barcode, such as a unique quick-response (QR) code. Obtaining the unique identifier can cause a specific listener computing device 124 to generate and transmit a translation request to the server 104. In response to receiving translation requests, the server 104 can determine preferred languages of the corresponding listeners 120, which is described in greater detail below.

The server 104 can then obtain machine translations of the media feed from its source language to one or more different target languages identified by the preferred languages of the listeners 120. The server 104 can perform machine language translation itself and/or the server 104 can obtain at least a portion of the machine language translation results from one or more other servers. After obtaining the translated media feed(s), the server 104 can output the translated media feed(s) via the one or more channels. In one example implementation, the channels are private channels that can only be accessed after obtaining the unique identifier. It will be appreciated, however, that the channels may also be public channels. The listener computing devices 124 that are accessing the private channels can receive the translated media feed, which can include a translated audio stream, translated text, or a combination thereof. The listener computing devices 124 can then output the translated media feed for their respective listeners 120.

Figure 2B:
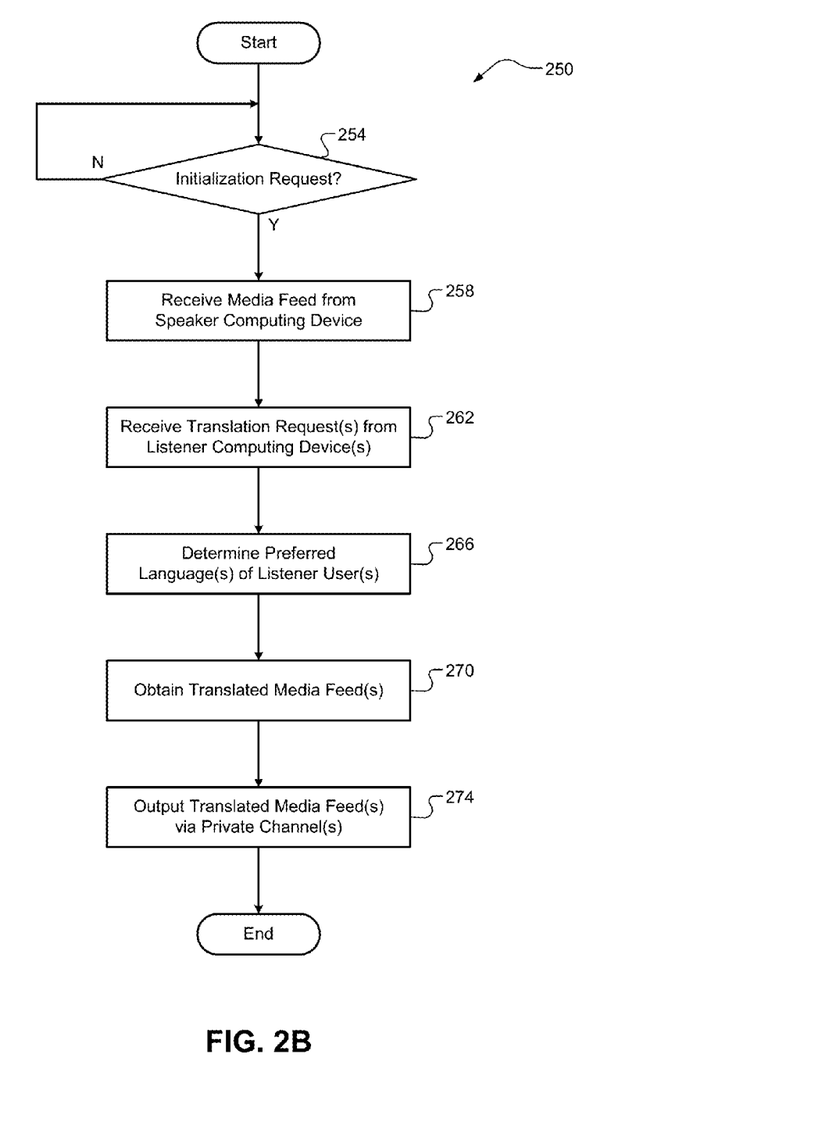
FIG. 2B is a flow diagram of an example technique for real-time translation and distribution of a media feed according to some implementations of the present disclosure.

Referring now to FIG. 2B, a flow diagram of an example technique 250 for translation and distribution of a media feed is illustrated. At 254, the server 104 can determine whether the initialization request has been received from the speaker computing device 108. The initialization request can be to allow others to obtain translations of a media feed via the one or more channels. If the initialization request has been received, the technique 250 can proceed to 258. If the initialization request has not been received, the technique 250 can end or return to 254. At 258, the server 104 can receive the media feed from the speaker computing device 108. At 262, the server 104 can receive a translation request for a translation of the media feed from the listener computing devices 124 associated with the listener users 120, respectively.

At 266, the server 104 can determine a preferred language for each listener user 120. At 270, the server 104 can obtain the machine translation of the media feed from its source language to the preferred language of each listener user 120 to obtain at least one translated media feed. For example, the server 104 and/or one or more other servers could perform the translation. At 274, the server 104 can output each translated media feed to its respective listener device via one or more channels. For example, each channel may correspond to a specific target language, and each translation request may be to join a corresponding channel in order to receive its corresponding translated media stream. The technique 250 can then end or return to 254.

Figure 3A:
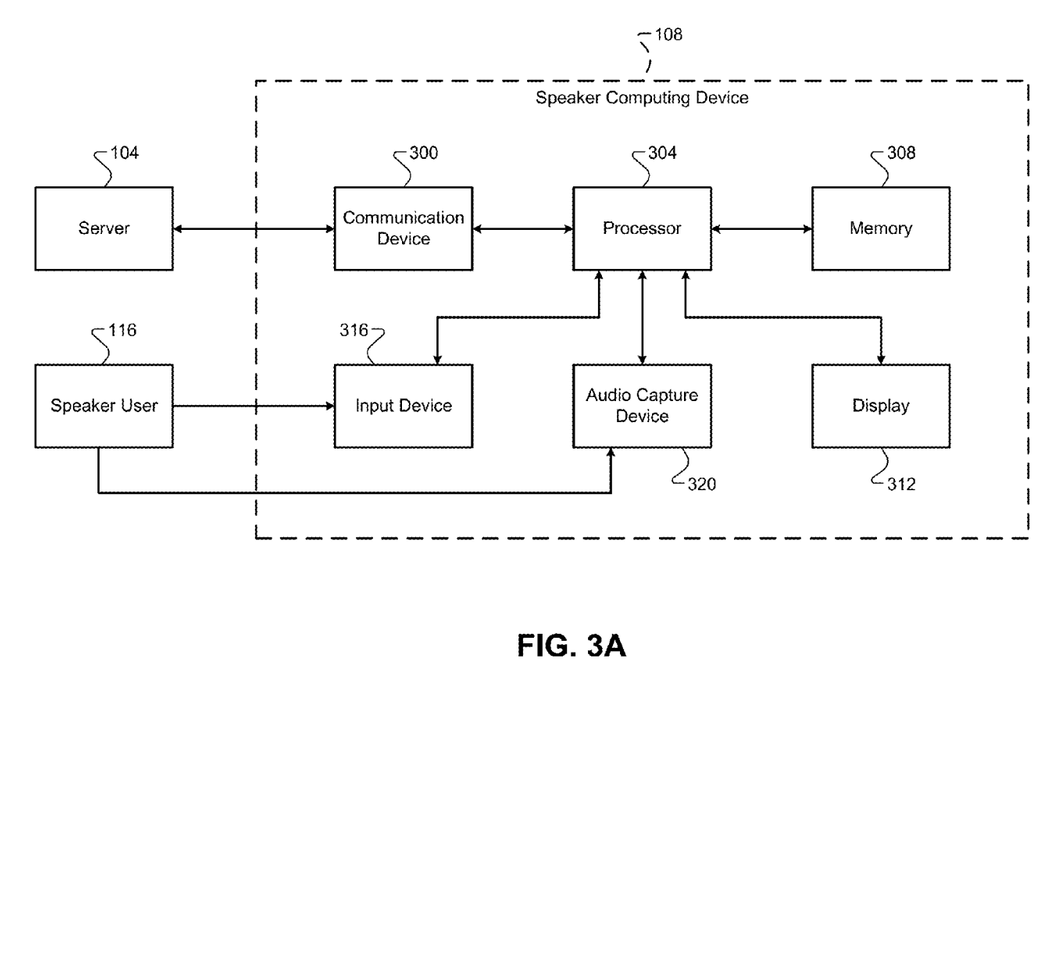
FIG. 3A is a functional block diagram of an example speaker computing device according to some implementations of the present disclosure.

Referring now to FIG. 3A, a functional block diagram of the example speaker computing device 108 is illustrated. The speaker computing device 108 can include a communication device 300, a processor 304, a memory 308, a display 312, an input device 316, and an audio capture device 320 (e.g., a microphone). The communication device 300 can include any suitable components (e.g., a transceiver) configured for communication with other devices (e.g., the server 104) via the network 112. The communication device 300 can also be configured for communication with other devices (e.g., the listener computing devices 124) via a short-range wireless communication medium (Bluetooth, WiFi Direct, NFC, etc.).

The processor 304 can control operation of the speaker computing device 108 and can implement at least a portion of the techniques of the present disclosure, which are described in greater detail below. The memory 308 can be any suitable storage medium (flash, hard disk, etc.) configured to store information at the speaker computing device 108. The display 312 can be any suitable display (display, touch display, etc.) configured to display information, the input device 316 can be any suitable input device (button, touchpad, etc.) configured to receive input from the speaker user 116, and the audio capture device 320 can be any suitable microphone configured to capture an audio stream of the speaker user 116 while he/she is speaking.

In one example implementation, the speaker computing device 108 can initially receive the initialization request from the speaker user 116, such as via the input device 316. In response to receiving the initialization request from the speaker user 116, the speaker computing device 108 can transmit the initialization request to the server 104. The speaker computing device 108 can then capture an audio stream representing speech by the speaker user 116 using the audio capture device 320. The speaker computing device 108 can obtain the media feed from the captured audio stream. In some implementations, the speaker computing device 108 can transcribe the audio stream to obtain text. As previously discussed, however, the media feed can include the audio stream, the text, or a combination thereof. For example only, the decision of where to transcribe the audio stream could be based on a speed of connection between the speaker computing device 108 and the server 104. In response to obtaining the media feed, the speaker computing device 108 can transmit the media feed to the server 104, which can then translate/transcribe and distribute the translated media feed(s) to the listener computing devices 124 via the private channel(s).

Figure 3B:
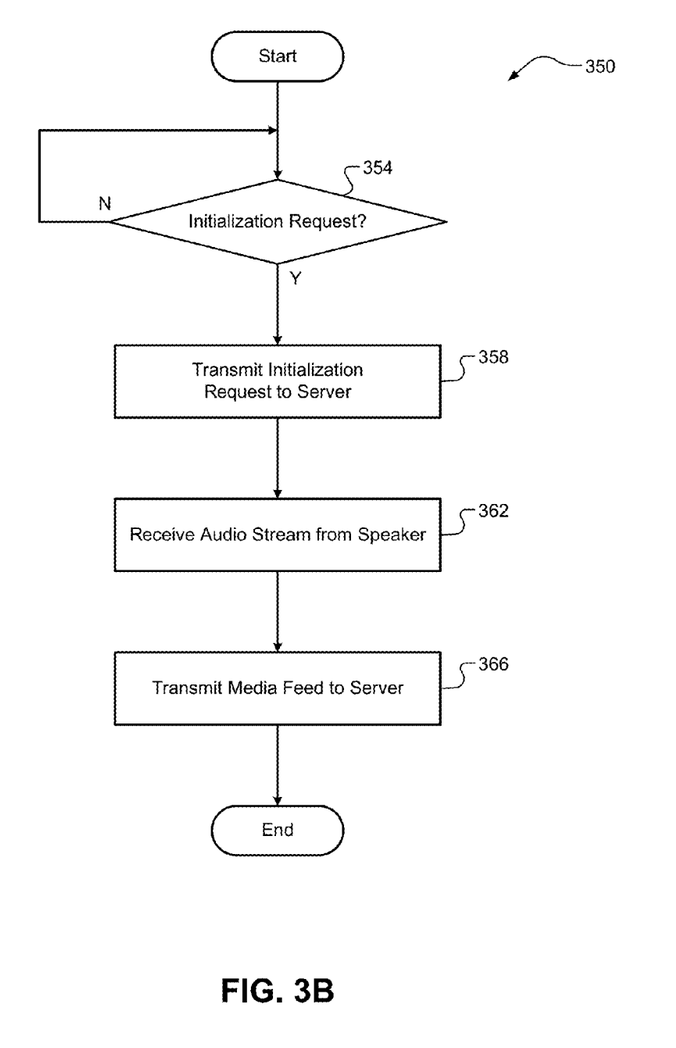
FIG. 3B is a flow diagram of another example technique for real-time translation and distribution of a media feed according to some implementations of the present disclosure.

Referring now to FIG. 3B, a flow diagram of another example technique 350 for translation and distribution of a media feed is illustrated. At 354, the speaker computing device 108 can determine whether an initialization request has been received from the speaker user 116. The initialization request can be to allow others (e.g., the listener users 120) to obtain translations of a media feed from the speaker computing device 108. If the initialization request has been received, the technique 350 can proceed to 358. If the initialization request has not been received, the technique 350 can end or return to 354. At 358, the speaker computing device 108 can transmit the initialization request to the server 104. Transmitting the initialization request to the server 104 can cause the server 104 to transmit/broadcast the unique identifier to nearby/proximate computing devices and/or post the unique identifier at a publicly-accessible website.

At 362, the speaker computing device 108 can receive an audio stream from the speaker user 116 via the audio capture device 320. At 366, the speaker computing device 108 can transmit the media feed to the server 104. The media feed can include (i) the audio stream and/or (ii) text transcribed from the audio stream, such as by the speaker computing device 108. Transmitting the media feed to the server 104 can cause the server 104 to translate the media feed from its source language to one or more target indicated by preferred language(s) of the listener users 120 and then output/distribute the translated media feeds to computing devices associated with the listener computing devices 124 via one or more channels. Each participant/participant device represents a participant that input the unique identifier via their participant device to generate a translation request for the server 104. For example, each private channel may correspond to a different target language. The technique 350 can then end or return to 354.

Figure 4A:
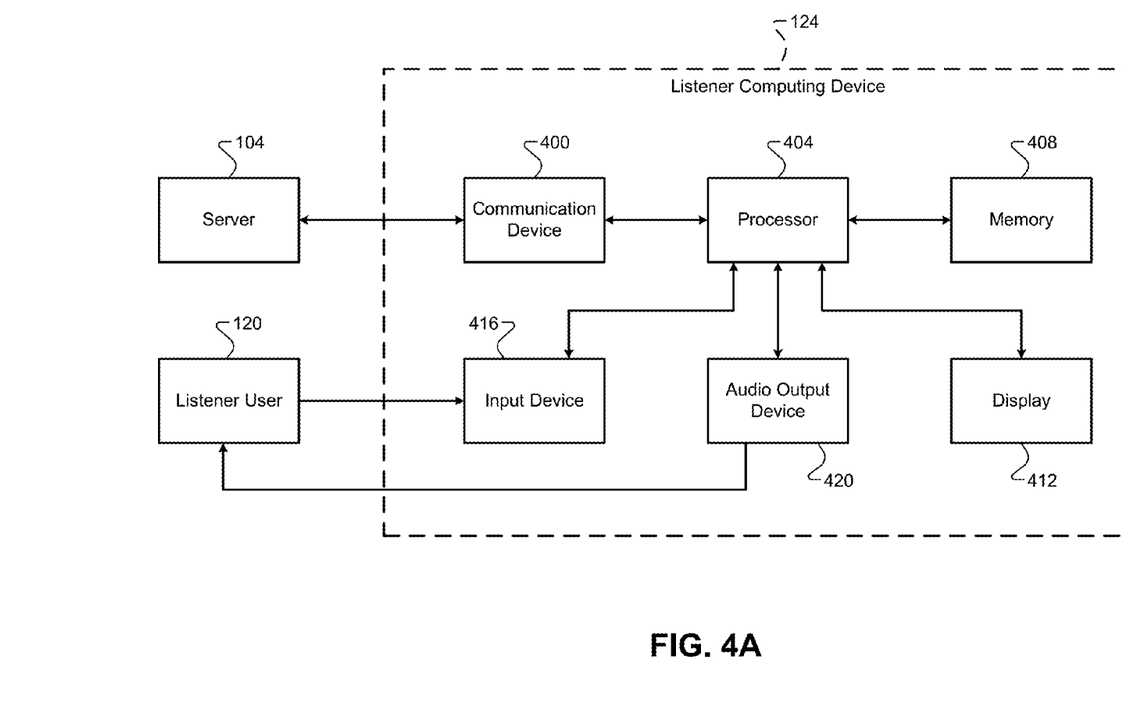
FIG. 4A is a functional block diagram of an example listener computing device according to some implementations of the present disclosure.

Referring now to FIG. 4A, a functional block diagram of one of the example listener computing devices 124 is illustrated. The listener computing device 124 can include a communication device 400, a processor 404, a memory 408, a display 412, an input device 416, and a speaker 420. The communication device 400 can include any suitable components (e.g., a transceiver) configured for communication with other devices (e.g., the server 104) via the network 112. The communication device 400 can also be configured for communication with other devices (e.g., the speaker computing device 108) via a short-range wireless communication medium (Bluetooth, WiFi Direct, NFC, etc.).

The processor 404 can control operation of the listener computing device 124 and can implement at least a portion of the techniques of the present disclosure, which are described in greater detail below. The memory 408 can be any suitable storage medium (flash, hard disk, etc.) configured to store information at the speaker computing device 108. The display 412 can be any suitable display (display, touch display, etc.) configured to display information, the input device 416 can be any suitable input device (button, touchpad, touch display, two-dimensional barcode scanner, etc.) configured to receive input from the respective listener user 120, and the audio output device 320 can be any suitable speaker or other audio output device (e.g., a headphone jack) configured to output the translated audio stream to the listener user 120.

In one example implementation, the listener computing device 124 can initially detect the unique identifier. As previously discussed, the unique identifier may be transmitted/broadcasted to the listener computing device 124 by the speaker computing device 108 and/or by the server 104. The unique identifier may also be posted at a website that is accessible by the listener computing device 124. When the unique identifier is detected, the listener computing device 124 can obtain the unique identifier. Examples of obtaining the unique identifier include selecting a unique URL and scanning a unique two-dimensional barcode, such as a unique QR code. In response to obtaining the unique identifier, the listener computing device 124 can generate and transmit a translation request to the server 104, as described in greater detail below.

In one example implementation, the translation request can include one or more preferred languages of the listener user 120. Alternatively, the server 104 may determine the preferred language(s) of the listener in response to receiving the translation request, such as by using a profile of the listener user 120 (e.g., universal language settings). For example only, the preferred language may be a current display language of the listener computing device 124. In response to transmitting the translation request to the server 104, the listener computing device 124 can receive the translated media feed from the server 104 via a respective private channel. Upon receiving the translated media feed, the listener computing device 124 can output the translated media feed for the listener user 120. For example, outputting the translated media feed can include outputting the translated text at the display 412, outputting the translated audio stream via the audio output device 420, or a combination thereof.

Figure 4B:
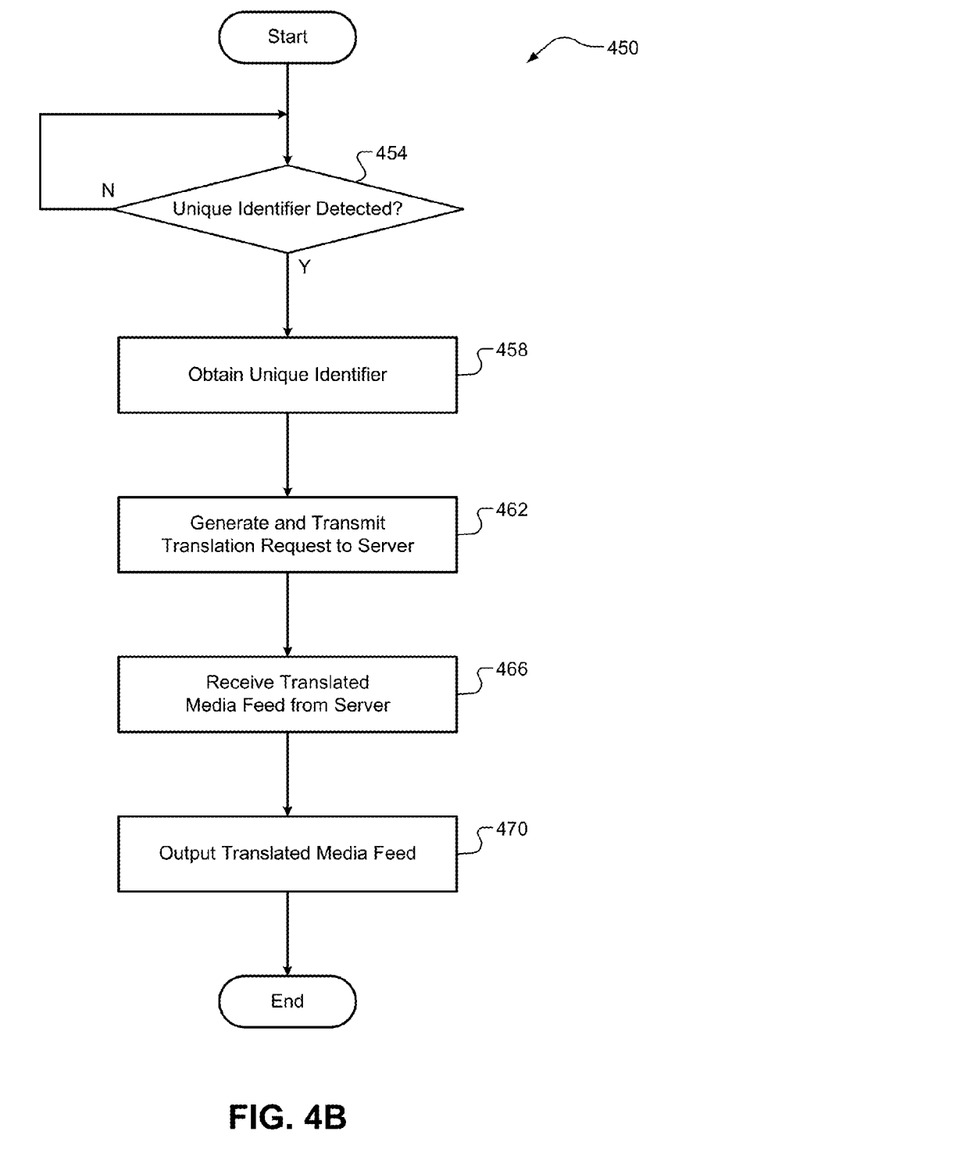
FIG. 4B is a flow diagram of another example technique for real-time translation and distribution of a media feed according to some implementations of the present disclosure.

Referring now to FIG. 4B, a flow diagram of another example technique 450 for translation and distribution of a media feed is illustrated. At 454, the listener computing device 124 can detect the unique identifier for obtaining the translation of the media feed from the speaker computing device 108. If the unique identifier is detected, the technique 450 can proceed to 458. If the unique identifier is not detected, the technique 450 can end or return to 454. At 458, the listener computing device 124 obtains the unique identifier. For example, the unique identifier may be obtained via a unique URL or via a unique two-dimensional barcode, e.g., a unique QR code. At 462, the listener computing device 124 transmits a translation request to the server 124 in response to obtaining the unique identifier.

For example, the translation request may be generated and transmitted in response to selecting the unique URL or scanning the unique two-dimensional barcode. In response to transmitting the translation request to the server 104, at 466, the listener computing device 124 receives the translated media feed from the server 104. In some implementations, however, the listener computing device 124 can receive the translated media feed from the speaker computing device 108. At 470, the listener computing device 124 outputs the translated media feed. This can include outputting translated/transcribed text at the display 412 and/or outputting a translated audio stream, e.g., via the audio output device 420 (a speaker, a headphone jack, etc.). The technique 450 can then end or return to 454.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
   receiving, at a server having one or more processors, a media feed from a speaker computing device, the media feed corresponding to a representation of speech of a speaker user in a source language that is captured by the speaker computing device;
   receiving, at the server, a plurality of translation requests, each translation request being received from a listener computing device associated with a listener user and corresponding to a request to obtain a translated version of the media feed into a target language of the listener user;
   determining, at the server, a preferred language for each listener user;
   obtaining, at the server, a machine translated media feed for each of the translation requests, the machine translated media feed corresponding to a translation of the media feed from the source language to the preferred language of the listener user associated with the translation request; and
   outputting, from the server, the machine translated media feeds to the listener computing devices.

2. The computer-implemented method of claim 1, further comprising receiving, at the server from the speaker computing device, an initialization request for the server to provide the machine translated media feeds in response to the translation requests.

3. The computer-implemented method of claim 2, further comprising outputting, from the server, a unique identifier in response to receiving the initialization request, wherein each of the translation requests are generated in response to inputting the unique identifier at the respective listener computing devices.

4. The computer-implemented method of claim 3, wherein the unique identifier is a unique uniform resource locator (URL) or a unique two-dimensional barcode.

5. The computer-implemented method of claim 1, wherein receiving each translation request at the server includes receiving, at the server, each translation request from the speaker computing device in response to the speaker computing device receiving each translation request from its respective listener computing device via short-range wireless communication.

6. The computer-implemented method of claim 5, wherein outputting each machine translated media feed to its respective listener computing device includes transmitting, from the server, each machine translated media feed to the speaker computing device, wherein receiving each translated media feed causes the speaker computing device to transmit each machine translated media feed to its respective listener computing device via short-range wireless communication.

7. The computer-implemented method of claim 1, wherein the media feed includes at least one of (i) an audio stream in the source language and (ii) text in the source language transcribed from the audio stream.

8. The computer-implemented method of claim 1, wherein the machine translated media feed includes at least one of (i) an audio stream in the target language and (ii) text in the target language transcribed from the audio stream.

9. The computer-implemented method of claim 1, wherein the speaker computing device is a mobile computing device.

10. The computer-implemented method of claim 9, wherein the mobile computing device is wearable, computer-implemented eyewear.

11. A system including a server having one or more processors configured to perform operations comprising:
receiving a media feed from a speaker computing device, the media feed corresponding to a representation of speech of a speaker user in a source language that is captured by the speaker computing device;
receiving a plurality of translation requests, each translation request being received from a listener computing device associated with a listener user and corresponding to a request to obtain a translated version of the media feed into a target language of the listener user;
determining a preferred language for each listener user;
obtaining a machine translated media feed for each of the translation requests, the machine translated media feed corresponding to a translation of the media feed from the source language to the preferred language of the listener user associated with the translation request; and
outputting the machine translated media feeds to the listener computing devices.

12. The system of claim 11, wherein the operations further comprise receiving, from the speaker computing device, an initialization request for the server to provide the machine translated media feeds in response to the translation requests.

13. The system of claim 12, wherein the operations further comprise outputting a unique identifier in response to receiving the initialization request, wherein each of the translation requests are generated in response to inputting the unique identifier at the respective listener computing devices.

14. The system of claim 13, wherein the unique identifier is a unique uniform resource locator (URL) or a unique two-dimensional barcode.

15. The system of claim 11, wherein receiving each translation request at the server includes receiving each translation request from the speaker computing device in response to the speaker computing device receiving each translation request from its respective listener computing device via short-range wireless communication.

16. The system of claim 15, wherein outputting each machine translated media feed to its respective listener computing device includes transmitting each machine translated media feed to the speaker computing device, wherein receiving each translated media feed causes the speaker computing device to transmit each machine translated media feed to its respective listener computing device via short-range wireless communication.

17. The system of claim 11, wherein the media feed includes at least one of (i) an audio stream in the source language and (ii) text in the source language transcribed from the audio stream.

18. The system of claim 11, wherein the machine translated media feed includes at least one of (i) an audio stream in the target language and (ii) text in the target language transcribed from the audio stream.

19. The system of claim 11, wherein the speaker computing device is a mobile computing device.

20. The system of claim 19, wherein the mobile computing device is wearable, computer-implemented eyewear.

* * * * *